United States Patent [19]

Chopping

[11] Patent Number: 5,793,760
[45] Date of Patent: Aug. 11, 1998

[54] METHOD OF MULTIPLEXING AND A MULTIPLEXER

[75] Inventor: Geoffrey Chopping, Wimborne, Great Britain

[73] Assignee: GPT Limited, United Kingdom

[21] Appl. No.: 867,991

[22] Filed: Jun. 3, 1997

Related U.S. Application Data

[63] Continuation of Ser. No. 387,735, filed as PCT/GB94/00980, May 6, 1994, published as WO94/27387, Nov. 24, 1994, abandoned.

[30] Foreign Application Priority Data

May 7, 1993 [GB] United Kingdom ............ 9309449

[51] Int. Cl.[6] ........................................ H04J 3/16
[52] U.S. Cl. ................... 370/355; 370/458; 370/476; 370/524; 370/540
[58] Field of Search ........................ 370/352, 355, 370/395, 458, 459, 468, 476, 522, 524, 537, 540

[56] References Cited

U.S. PATENT DOCUMENTS

| | | | |
|---|---|---|---|
| 4,731,785 | 3/1988 | Ferenc et al. | 370/60 |
| 4,965,790 | 10/1990 | Nishino et al. | 370/85.7 |
| 5,103,447 | 4/1992 | Takiyasu et al. | 370/112 |
| 5,130,982 | 7/1992 | Ash et al. | 370/85.7 |
| 5,355,362 | 10/1994 | Gorshe et al. | 370/112 |
| 5,390,184 | 2/1995 | Morris | 370/94.2 |
| 5,463,620 | 10/1995 | Sriram | 370/94.2 |

FOREIGN PATENT DOCUMENTS

| | | |
|---|---|---|
| 0 168 927 A2 | 1/1986 | European Pat. Off. . |
| 0 202 205 A1 | 11/1986 | European Pat. Off. . |
| 0 214 352 A1 | 3/1987 | European Pat. Off. . |
| 0 250 160 A2 | 12/1987 | European Pat. Off. . |
| 0 428 407 A3 | 5/1991 | European Pat. Off. . |
| 0 440 059 A1 | 8/1991 | European Pat. Off. . |
| 37 20 799 A1 | 1/1989 | Germany . |
| 63-309038 | 12/1988 | Japan . |
| 2162721 | 2/1986 | United Kingdom . |

OTHER PUBLICATIONS

Einfuhrung in Die Datenfernverarbeitung 9. Teil: Multiplexer–Datenubertragung in konzentrierter Form, Ing. Gerhard Kafka, pp. 133–142, Sender–Publikation TeleCom.
Proceedings, VLSI and Computer Peripherals, 3rd Annual European computer Conference, Hamburg, May 8–12, 1989, Maurizio Decina, Politecnico di Milano, Department of Electronics, Milan, Italy, pp. 4–67 through 4–70.
Broadband User–Network Interfaces to ISDN, S.E. Minzer, pp. 364–369, Zie Voor Titel Boek, de 2e Pagina.

*Primary Examiner*—Douglas W. Olms
*Assistant Examiner*—Min Jung
*Attorney, Agent, or Firm*—Kirschstein, et al.

[57] ABSTRACT

A pure ATM based multiplex is incapable, especially at low carrier rates, of satisfactorily carrying constant bit rate traffic or/human communication traffic. A multiplex format having a plurality of constant bit rate timeslots in which a timeslot is not in use for constant bit rate traffic can have that timeslot used for message based traffic to provide a composite constant bit rate/message based data stream.

9 Claims, 11 Drawing Sheets

| CRC4 FRAME | SPARE BIT 4 | SPARE BIT 6 | SPARE BIT 7 | SPARE BIT 8 |
|---|---|---|---|---|
| 1 | 5×1 5×0 | T S 1 | T S 2 | T S 3 |
| 3 | T S 4 | T S 5 | T S 6 | T S 7 |
| 5 | T S 8 | T S 9 | T S 10 | T S 11 |
| 7 | T S 12 | T S 13 | T S 14 | T S 15 |
| 9 | T S 16 | T S 17 | T S 18 | T S 19 |
| 11 | T S 20 | T S 21 | T S 22 | T S 23 |
| 13 | T S 24 | T S 25 | T S 26 | T S 27 |
| 15 | T S 28 | T S 29 | T S 30 | T S 31 |

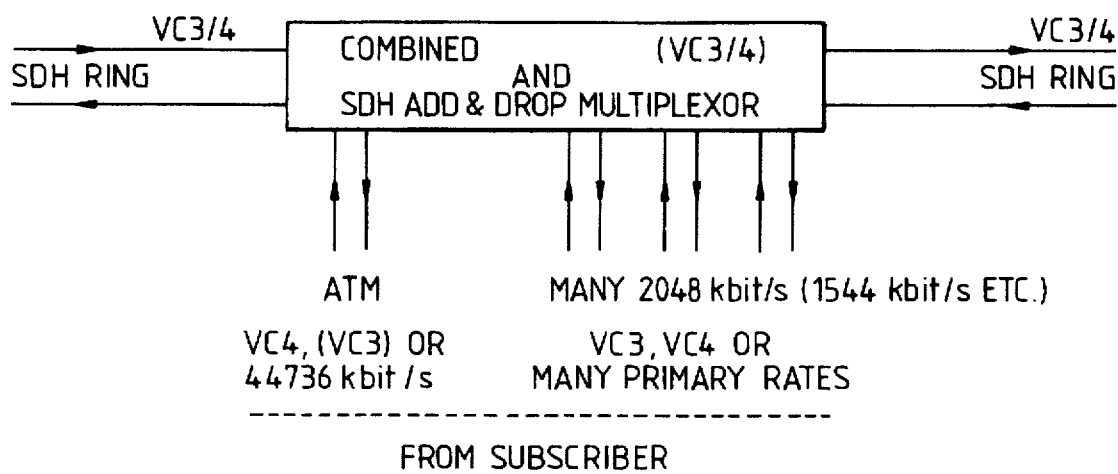
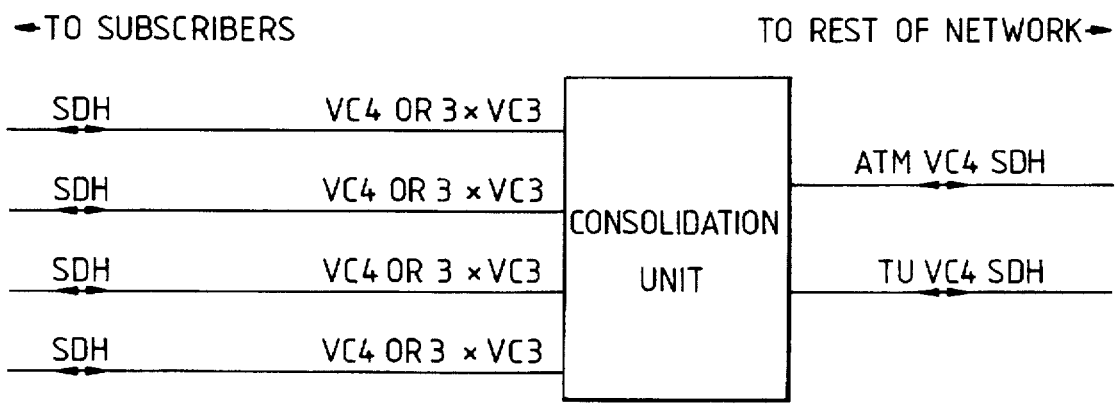

Fig.14.

Z4 FORMAT RELATIVE TO H4 (MULTIFRAME INDICATOR) SEQUENCE

| FRAME NUMBER | H4 SEQUENCE | Z4 SIGNIFICANCE |
|---|---|---|
| 0  | 00 00 000 0 | 001 002 003 004 005 006 007 008 |
| 1  | 00 00 000 1 | 009 010 011 012 013 014 015 016 |
| 2  | 00 01 001 0 | 017 018 019 020 021 022 023 024 |
| 3  | 00 01 001 1 | 025 026 027 028 029 030 031 032 |
| 4  | 00 10 010 0 | S1 S2 A5 A4 A3 A2 A1 A0 |
| 5  | 00 10 010 1 | S1 S2 A5 A4 A3 A2 A1 A0 |
| 6  | 01 00 011 0 | 033 034 035 036 037 038 039 040 |
| 7  | 01 00 011 1 | 041 042 043 044 045 046 047 048 |
| 8  | 01 01 100 0 | 049 050 051 052 053 054 055 056 |
| 9  | 01 01 100 1 | 057 058 059 060 061 062 063 064 |
| 10 | 01 10 101 0 | S1 S2 A5 A4 A3 A2 A1 A0 |
| 11 | 01 10 101 1 | S1 S2 A5 A4 A3 A2 A1 A0 |
| 12 | 10 00 110 0 | 065 066 067 068 069 070 071 072 |
| 13 | 10 00 110 1 | 073 074 075 076 077 078 079 080 |
| 14 | 10 01 111 0 | 081 082 083 084 085 086 087 088 |
| 15 | 10 01 111 1 | 089 090 091 092 093 094 095 096 |
| 16 | 10 10 000 0 | S1 S2 A5 A4 A3 A2 A1 A0 |
| 17 | 10 10 000 1 | S1 S2 A5 A4 A3 A2 A1 A0 |
| 18 | 11 00 001 0 | 097 098 099 100 101 102 103 104 |
| 19 | 11 00 001 1 | 105 106 107 108 109 110 111 112 |
| 20 | 11 01 010 0 | 113 114 115 116 117 118 119 120 |
| 21 | 11 01 010 1 | 121 122 123 124 125 126 127 128 |
| 22 | 11 10 011 0 | S1 S2 A5 A4 A3 A2 A1 A0 |
| 23 | 11 10 011 1 | S1 S2 A5 A4 A3 A2 A1 A0 |
| 24 | 00 00 100 0 | 129 130 131 132 133 134 135 136 |
| 25 | 00 00 100 1 | 137 138 139 140 141 142 143 144 |
| 26 | 00 01 101 0 | 145 146 147 148 149 150 151 152 |
| 27 | 00 01 101 1 | 153 154 155 156 157 158 159 160 |
| 28 | 00 10 110 0 | S1 S2 A5 A4 A3 A2 A1 A0 |
| 29 | 00 10 110 1 | S1 S2 A5 A4 A3 A2 A1 A0 |
| 30 | 01 00 111 0 | 161 162 113 164 165 166 167 168 |
| 31 | 01 00 111 1 | 169 170 171 172 173 174 175 176 |
| 32 | 01 01 000 0 | 177 178 179 180 181 182 183 184 |
| 33 | 01 01 000 1 | 185 186 187 188 189 190 191 192 |
| 34 | 01 10 001 0 | S1 S2 A5 A4 A3 A2 A1 A0 |
| 35 | 01 10 001 1 | S1 S2 A5 A4 A3 A2 A1 A0 |
| 36 | 10 00 010 0 | 193 194 195 196 197 198 199 200 |
| 37 | 10 00 010 1 | 201 202 203 204 205 206 207 208 |
| 38 | 10 01 011 0 | 209 210 211 212 213 214 215 216 |
| 39 | 10 01 011 1 | 217 218 219 220 221 222 223 224 |
| 40 | 10 10 100 0 | S1 S2 A5 A4 A3 A2 A1 A0 |
| 41 | 10 10 100 1 | S1 S2 A5 A4 A3 A2 A1 A0 |
| 42 | 11 00 101 0 | 225 226 227 228 229 230 231 232 |
| 43 | 11 00 101 1 | 233 234 235 236 237 238 239 240 |
| 44 | 11 01 110 0 | 241 242 243 244 245 246 247 248 |
| 45 | 11 01 110 1 | 249 250 251 252 – – – – |
| 46 | 11 10 111 0 | S1 S2 A5 A4 A3 A2 A1 A0 |
| 47 | 11 10 111 1 | S1 S2 A5 A4 A3 A2 A1 A0 |

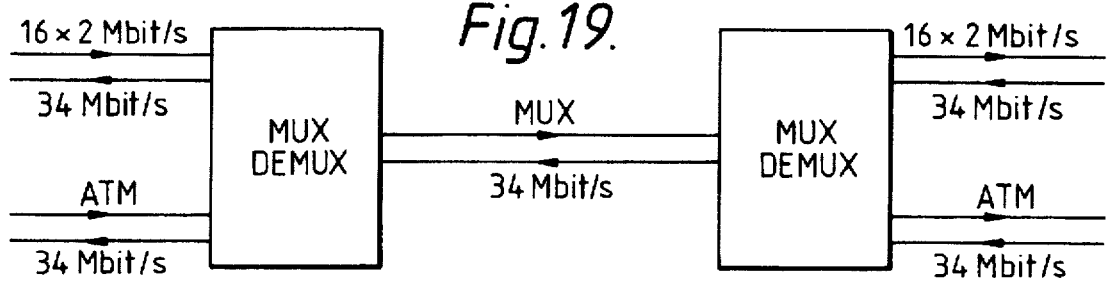

METHOD OF MULTIPLEXING AND A MULTIPLEXER

CROSS REFERENCE TO RELATED APPLICATION

This application is a continuation of Ser. No. 08/387,735, filed as PCT/GB94/00980, May 6, 1994, published as WO94/27387, Nov. 24, 1994, abandoned simultaneously herewith.

BACKGROUND OF THE INVENTION

A multiplexer/demultiplexer (mux/demux) is proposed which, for example, as a basic requirement is able to carry constant bit rate services based on a regular 125 microseconds time base as well as statistical traffic based on ATM cells.

It should be understood that when multiplexing of a signal is carried out it is necessary to provide a multiplexer to carry out the multiplexing and a demultiplexer at the far end of the signal connection to recover the original. Additionally, to provide two way communication, a multiplexer and a demultiplexer are necessary at each end of the connection. Frequently a multiplexer and a demultiplexer are combined in a single multiplexer/demultiplexer unit.

The use of the term multiplexer should accordingly be considered as applying to a multiplexer, a demultiplexer or a multiplexer/demultiplexer as appropriate.

For a combination of reasons, a pure ATM based multiplex is incapable, especially at low carrier rates, of satisfactorily carrying constant bit rate traffic, or human communication traffic.

The format described provides an efficient transport medium for the part of the telecommunication network where the cost of bandwidth is the most expensive, such as the subscriber interface and leased megastream circuits. It could also be applicable to the concentrator to host interface.

SUMMARY OF THE INVENTION

According to the present invention there is provided a multiplex format-comprising a plurality of constant bit rate time slots wherein a time slot which is not in use for constant bit rate traffic is used for message based traffic to provide a composite constant bit rate/message based data stream.

There is further provided a multiplex comprising means to operate using a multiplex format as above.

A connected pair of multiplexers may be in a master/slave relationship.

BRIEF DESCRIPTION OF THE DRAWINGS

The present invention will now be described by way of example, with reference to the accompanying drawings, in which:

FIG. 12 shows a general arrangement of a combined VC3/4 and SDH Add/Drop Multiplexer as one unit in a ring;

FIG. 13 shows a Consolidation Unit for VC4 and VC3 signals;

FIG. 14 shows the relationship between the Z4 Format and H4 (Multiframe Indicator) Sequence;

FIG. 19 shows a 34 Mbit/s multiplexer/demultiplexer arrangement;

FIG. 20 shows the basic arrangement of the multiplexer of FIG. 19; and

FIG. 21 shows the basic arrangement of the demultiplexer of FIG. 19.

DETAILED DESCRIPTION OF THE PREFERRED EMBODIMENT

As described it is designed to work at more than one carrier rate, from 2 Mbit/s downwards, although the principle could be extended upwards.

The multiplex must be able to carry circuits of 8 kbit/s, 16 kbit/s, 32 kbit/s, 64 kbit/s, N×64 kbit/s circuits and ATM cells and be capable of being dynamically reformatted to carry a different mix of circuit rates without long and complicated reconfiguration procedures or fragmentation.

Low delay is achieved for both constant bit rate and ATM services, with no delay variation for constant bit rate services.

The initial description is based on 2 Mbit/s, other carrier bit rate variants being described later.

Figure 1A:
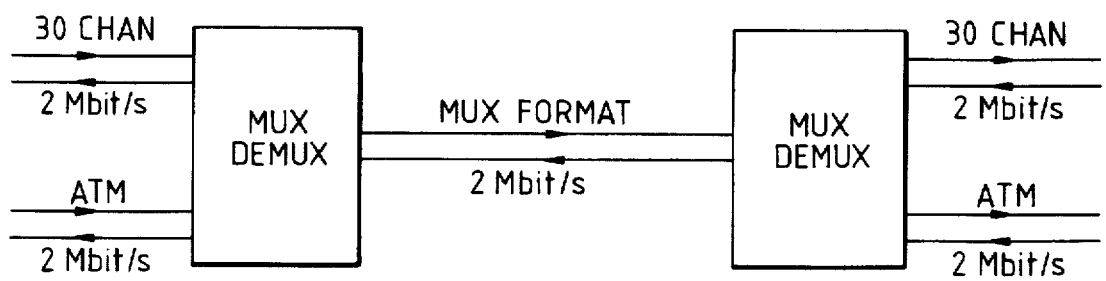
FIG. 1A is a diagrammatic representation of a basic bidirectional multiplexer/demultiplexer.
Figure 1B:
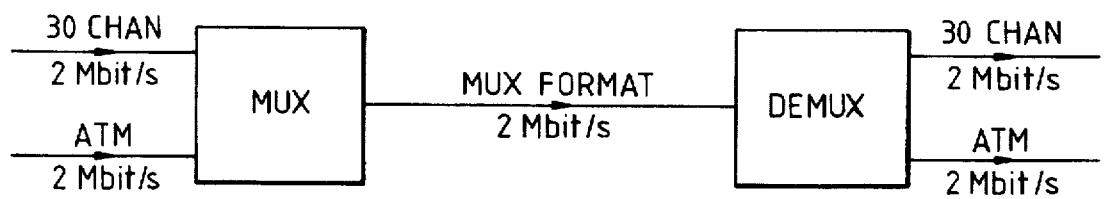
FIG. 1B is a diagrammatic representation of a unidirectional multiplexer/demultiplexer forming a part of the multiplexer/demultiplexer of FIG. 1A.

The basic arrangement is as shown in FIG. 1A, the arrangement of FIG. 1A being made up from two similar unidirectional arrangements as shown in FIG. 1B.

It can be assumed that all the interfaces can be physical 2048 kbit/s HDB3 links. The mux/demux could be subsequently integrated, with just the formatted link remaining as HDB3 or being carried by an SDH VC12.

Thirty channel PCMs have been defined for a long time enabling up to thirty 64 kbit/s circuits to be carried on 2048 kbit/s.

Recently the European Telecommunications Standards Institute (ETSI) has agreed a format for low rate Asynchronous Transfer Mode (ATM) circuits to be carried on 2048 kbit/s.

It would be very useful to carry a varying mix of 64 kbit/s circuits and ATM circuits on the same 2048 kbit/s carrier, without having to transform 64 kbit/s to ATM or ATM to 64 kbit/s.

The present proposal is arranged to offer such a mixed capability.

The interface format looks very much like the normal 2 Mbit/s format as explained by G.704 of CCITT.

The format has 32 Time slots, 0 to 31.

Time slot 0 has alternate frame alignment patterns.

Bits 1 of alternate time slots 0 have the Cyclic Redundancy Check (CRC4) check sum and the 16 Frame, multiframe sequence.

CRC4 should of course be used to help measure the quality of the line, but the multiframe sequence is also important.

In a 16 frame sequence the spare bits, in alternate time slots 0, are available 8 times.

Use will be made of 4 of the 5 spare bits.

Figures 2, 3:
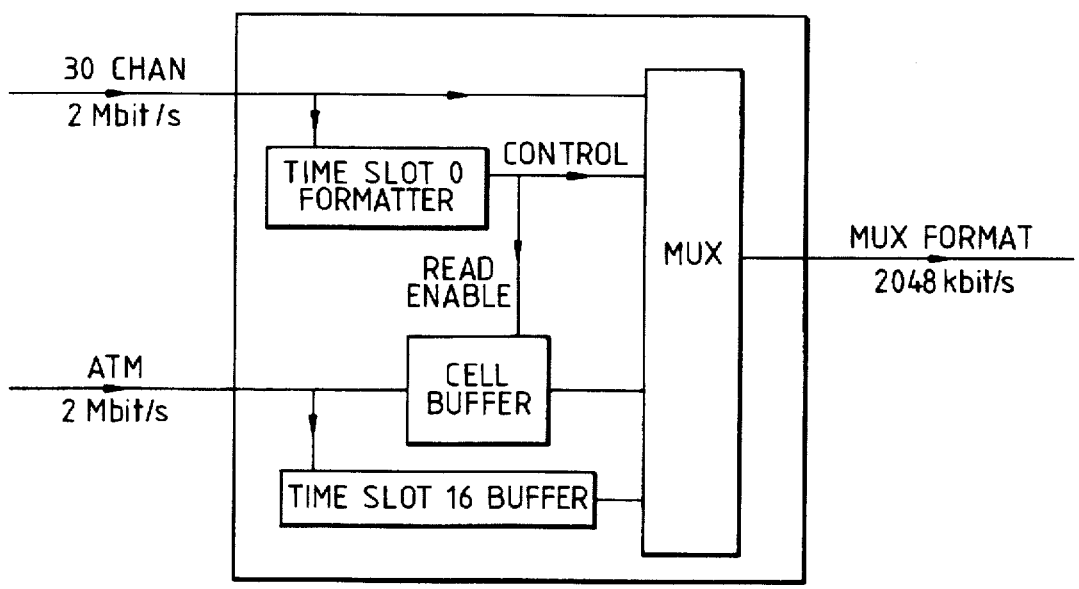
FIG. 2 is a table showing the use of the spare bits to identify the timeslots.
FIG. 3 shows the basic arrangement of a multiplexer.

Because spare bit 5 can have a synchronisation significance, spare bits 4, 6, 7 and 8 should be used. The significance of the spare bits is shown in FIG. 2.

Apart from Time slot 0, which is of course specially formatted, there is a time slot indicator contained in the above spare bit sequence for each of the other 31 time slots.

These indicators simply state whether a time slot is in use as a 64 kbit/s time slot, or is free for ATM traffic.

Because any errors in the time slot indicators would lead to not recreating the 64 kbit/s circuits and ATM cells correctly, a majority voting arrangement is included.

Because Time slot zero does not need an indicator, Spare Bit 4 of CRC4 Frame 1 follows a continuing sequence of 1111100000111100000 in order to clearly define groups of 5 multiframes.

As the five copies of a time slot indicator are spaced out by 2 ms, they should not be affected by burst errors.

A multiframe (16×125 microseconds) occurs every 2 milliseconds, so 5 multiframes occur every 10 milliseconds. Therefore the mix between constant bit rate traffic and ATM traffic can be changed 100 times a second.

So as a 64 kbit/s circuit is cleared down the ATM pipe is expanded. When a new 64 kbit/s circuit is required, provided the ATM pipe has enough spare capacity to release some bandwidth, a time slot can be allocated back to the constant bit rate service.

FIG. 3 shows the basic arrangement of the multiplexer.

Each full cell that arrives from the ATM 2 Mbit/s interface is stored in the cell buffer.

Stored cells are read from the buffer, a byte at a time, whenever an unused time slot is available on the multiplexer interface.

The time slot zero format should be supplied by the Constant Bit Rate Interface in its time slot zero, unless a fixed mix between constant bit rate and ATM circuits is being offered.

The ETSI format implies that time slot 16 is not used for ATM cells. It is not clear that there is any particular use for time slot 16.

However in case it has to be transferred across as a time slot, it would have to be held by a time slot 16 buffer and used to replace one of the constant bit rate time slots.

Figure 4:
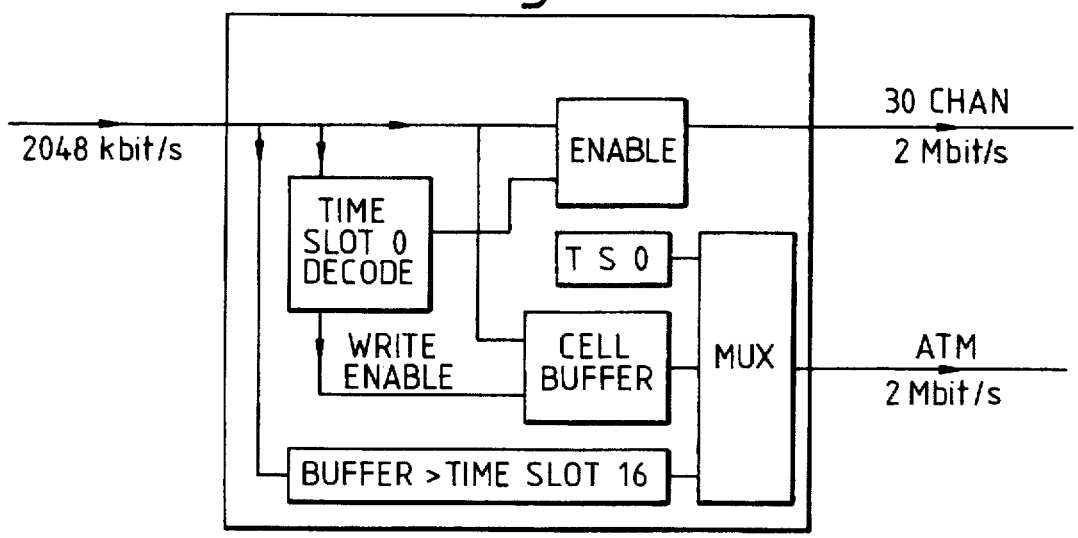
FIG. 4 shows the basic arrangement of a demultiplexer.

A similar buffer is shown in the demultiplexer, the basic arrangement for which is shown in FIG. 4.

The time slot decode circuitry determines, from the spare bits, which of the time slots are constant bit rate and which are ATM bytes.

Each full cell that arrives from the 2 Mbit/s interface is stored in the cell buffer.

Available cells are read from the cell buffer and supplied to the ATM interface mux function so as to be correctly sequenced with time slot 0 and 16.

For lower carrier rates than 2 Mbit/s, the above arrangement can be offered with the higher numbered time slots missing, except for time slot 16.

As there are not the spare bits available in the 1544 kbit/s structure, a separate time slot may need to be allocated for the time slot indicator bits.

For 1 Mbit/s and below the Frame alignment sequence could be run at 4 kHz with the time slot 16 bandwidth cut to 32 kbit/s, thereby cutting the bandwidth overhead.

The technique can be applied also at other rate s higher than 2 Mbit/s, the advantage of 2 Mbit/s is that the standard exists for this synchronous multiplex as do the line carriers.

For circuit rates lower than 64 kbit/s a complete 64 kbit/s channel may be defined as say 4 times 16 kbit/s channels. Unless the number of time slot indicator bits is significantly expanded, only when a whole 64 kbit/s channel is not being used could it be made available to carry ATM. As so much of todays traffic is considered as bytes it may be easier to restrict time slot indicators to the level of a whole byte.

The mechanisms described could permit the releasing of 64 kbit/s circuits during quiet periods provided enough redundancy is built in to stop errors resulting in major cell loss. This may result in a high bandwidth overhead and so reduce any savings gained.

Unless the redundant time slot indicators are well spaced out, burst errors can negate the redundancy, but spacing out the time slot indicators introduces delay.

The use of such a multiplexer/demultiplexer to merge a partially used 64 kbit/s circuit Megastream and ATM, could provide a free standing product.

Merging ATM, Frame relaying or any other statistical based format, is just a variation on the same theme.

Although the mixing of a pair of 2 Mbit/s multiplexes carrying ATM and 64 kbit/s has been described, the ATM multiplex could instead be a frame relaying, packet or any message based multiplex provided that active frames, packets or cells can be distinguished from idle fill in codes.

An additional feature is to have a master end and a slave end.

The technique has been described as having two similar, but independent, unidirectional parts and it can still operate in that manner when required.

It is also possible to say that in many circumstances the two directions will have the same 64 kbit/s to ATM split, in which case if one end is declared as the Slave end, then the Slave end can be told to transmit a 64 kbit/s to ATM split as defined by the spare bits it receives from the other end of the link. It is probably not advisable to tell the other end it is the Master end as it must still decode the 64 kbit/s to ATM split it receives from the Slave end in order to ensure changes to the split are done in a synchronised fashion.

Time slot 16 signalling can be used to indicate the busy and free 64 kbit/s channels.

When there is relevant signalling information within the Time Slot 16 on the 2 Mbit/s I/F carrying 64 kbit/s channels, then it can be monitored in order to determine the busy and free channels.

Having determined the busy and free channels, this information can be used to control the spare bits in time slot 0.

The spare bits are still necessary so that the mux can clearly indicate to the demux the busy/free status of each channel to synchronise any changes.

The monitoring of Time Slot 16 will require both directions of Time Slot 16 transmission to be monitored. (According to the DASS 2 protocol a circuit should not be released until clears have been seen in both directions).

A first example is for a manually controlled link, perhaps in a private network where this technique is used for reducing the number of megastream circuits. So that both directions of transmission can be controlled from one end, the controlling end would be in manual mode and the other end in slave mode.

The second example is for an ISPBX connected to System X via a 2 Mbit/s link which is often not heavily loaded. Rather than install a second 2 Mbit/s link for some ATM traffic, a pair of multiplexer-demultiplexer units, one at the ISPBX end and one at the exchange end, are used to multiplex the unit ATM onto the spare bandwidth of the 2 Mbit/s link. One unit monitors both directions of the time slot 16 signalling to determine the changes in the busy/free states of the 64 kbit/s to ATM split and sets the spare bits accordingly. It is probably better if the second unit operates in slave mode so that it stays in step with the unit in time slot 16 mode.

A multiplexer/demultiplexer can have its transmitted 64 kbit/s to ATM split controlled by;

switch settings (manual mode)

received Spare bits of the 2 Mbit/s I/F carrying 64 kbit/s (spare bit mode)

received Spare bits of the multiplexer/demultiplexer I/F (slave mode)

time slot 16 signalling messages (time slot 16 mode)

The proposal can be extended for use with VC4's. The mixing granularity is at the column level.

This makes a pair of VC4 payloads carried by SDH. One is carrying many TU's (for example 63×TU12's each carrying a 2048 kbit/s primary rate circuit). The other is carrying ATM cells, Frames or Packets.

Figure 5:
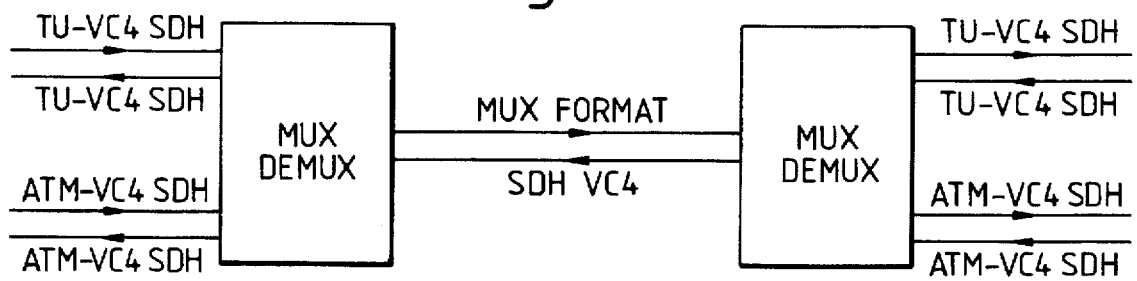
FIG. 5 shows a multiplexer/demultiplexer for use with VC4 payloads.
Figure 6:
FIG. 6 shows a unidirectional constituent part of FIG. 5.

The basic arrangement is shown in FIG. 5 and FIG. 6 shows a constituent unidirectional part.

The multiplexer/demultiplexer should be able to work from the TU-VC4 line timing or the ATM-VC4 line timing or an internal crystal, in order to cater for failures and testing. Therefore the TU's from the TU-VC4 should be individually rejustified to the device Timing standard. The ATM-VC4 should also be rejustified to the device timing standard so that the cells can be easily extracted.

Timing Indicators should be offered in order to minimise the phase distortion to the carried tributaries.

Having rejustified the TU-VC4 down to the TU level, there is no longer an active AU4 pointer. All that remains of the C4 Container is the 252 columns of the TU's.

The multiplexer is trying to multiplex two partially loaded VC4's into one multiplexer.

A VC4 Virtual Container is carried as 261 columns. This is made up of a C4 Container of 260 columns and a Path Overhead of one column (9 bytes).

The multiplexer must have its own VC4 Path Overhead (POH) column carried in the normal Path Overhead position (as indicated by the AU4 pointer).

The POH's of the TV-VC4 and the ATM-VC4 that are being multiplexed, are terminated by the multiplexer.

New POH's must be generated by the demultiplexer for the reformed TU-VC4 and the ATM-VC4. There is no automatic transfer of bytes from the terminated POH's to the new POH's.

The method described below uses one C4 column to signal the ATM/TU split.

The VC4 contains 261 columns.

| | |
|---|---|
| Path Overhead | 1 Column |
| | J1 VC4 Path Trace |
| | B3 BIP-8 |
| | C2 Signal Label |
| | G1 Path Status |
| | F2 VC4 Path User Channel |
| | H4 Multiframe Indicator |
| | Z3 Spare |
| | Z4 Spare |
| | Z5 Spare |
| Control | 1 Column |
| | BBAAAAAA |
| | SXXXXXXX |
| | XXXXXXXX |
| | XXXXXXXX |
| | XXXXXXXX |
| | XXXXXXXX |
| Control | 1 Column |
| | XXXXXXXX |
| | XXXXXXXX |
| | XXXXXXXX |
| ATM Cells ONLY | 7 Columns |
| ATM Cells or TU's | 252 Columns |

A = Next Byte Number of cell 00 to 52
BB = 4 value count of quad frame
S = Majority Voting sequence over 5 quad frames 11000.
X = 252 off ATM/TU indicators over quad frame
ATM cell is 0, TU is 1.

The Majority Voting Sequence takes 20 frames, which allows for 400 complete bandwidth updates per second.

| 20 FRAME SEQUENCE OF BB AND S BITS | |
|---|---|
| BB | S |
| 00 | 1 |
| 01 | 1 |
| 10 | 1 |
| 11 | 1 |
| 00 | 1 |
| 01 | 1 |
| 10 | 1 |
| 11 | 1 |
| 00 | 0 |
| 01 | 0 |
| 10 | 0 |
| 11 | 0 |
| 00 | 0 |
| 01 | 0 |
| 10 | 0 |
| 11 | 0 |
| 00 | 0 |
| 01 | 0 |
| 10 | 0 |
| 11 | 0 | there is an alternative method using 2 bytes from the path overhead. This would allow 100% ATM carrying, but would require a change to the SDH recommendations and only allow 33 updates per second.

This relies on the H4 Multiframe sequence of the POH. The BB field is not used.

The VC4 contains 261 columns.

| | |
|---|---|
| Path Overhead | 1 Column |
| | J1 VC4 Path Trace |
| | 83 BIP-8 |
| | C2 Signal Label |

|                  | -continued                      |
|------------------|----------------------------------|
|                  | G1 Path Status                  |
|                  | F2 VC4 Path User Channel        |
|                  | H4 Multiframe Indicator         |
|                  | Z3 Spare                        |
|                  | Z4 SSAAAAAA                     |
|                  | Z5 XXXXXXXX                     |
| ATM Cells ONLY   | 8 Columns                       |
| ATM Cells or TU's| 252 Columns                     |

A = Next Byte Number of cell 00 to 52
S = Majority Voting sequence over 5 off 48 frames 11000.
S = Inverse of S
X = 252 off ATM/TU Indicators over first 32 frames of the H4 multiframe of 48 frames.

The Majority Voting Sequence takes 240 frames, which allows for 33 complete bandwidth updates per second.

The multiplexer/demultiplexer looks for the All 1's condition in each of the defined TU's.

Path Unequipped is a valid condition which may be used for network testing and should not be overwritten by ATM cells.

Any columns not defined as being for TU's will be made available for cells.

Any columns, which make up TU's which are in the All 1's state, will be made available for cells.

Master/Slave operation may be used as described earlier.

SDH has considerable message based communications capability. The Master end can be controlled by an SDH communications channel.

Figure 7:
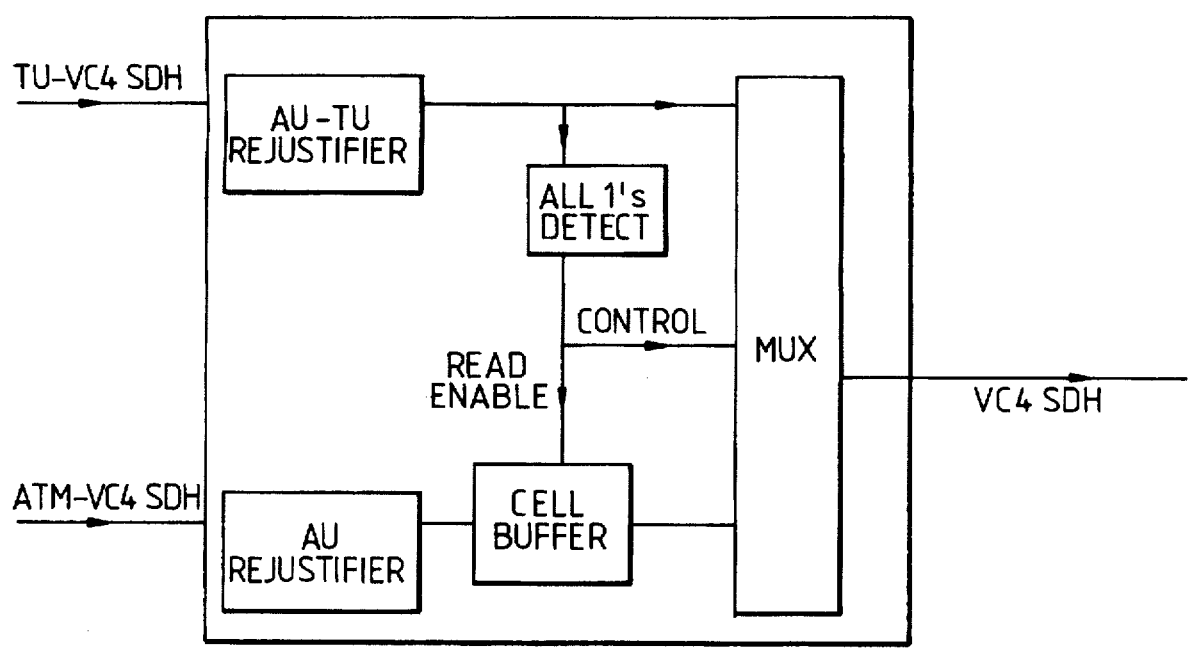
FIG. 7 shows the basic arrangement of a multiplexer of FIG. 5.

FIG. 7 shows the basic arrangement of the multiplexer.

Figure 8:
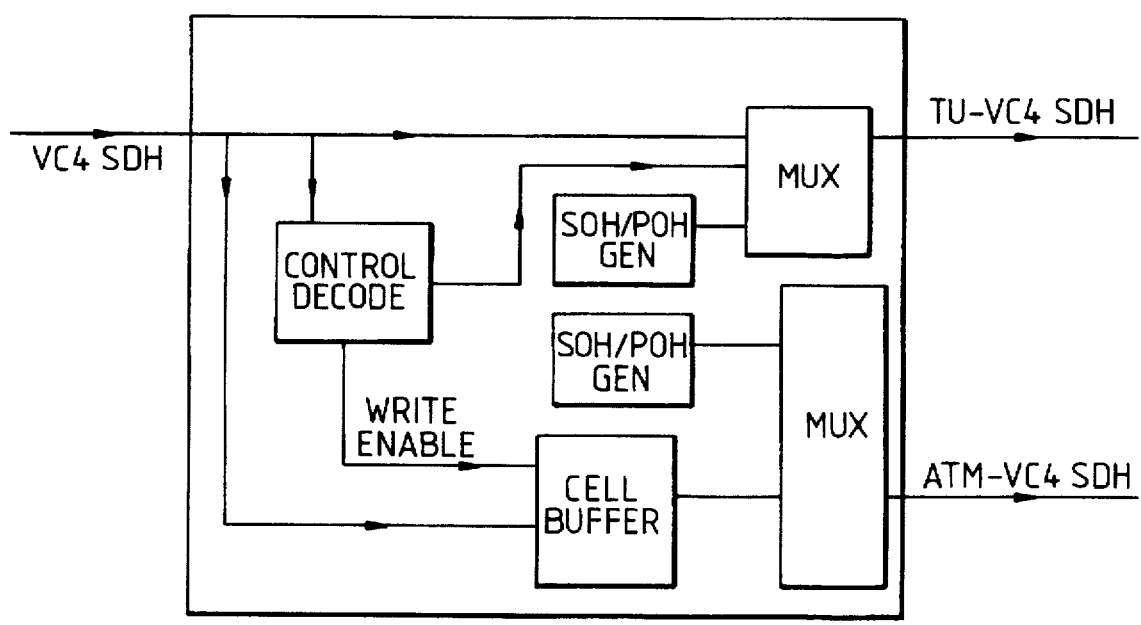
FIG. 8 shows the basic arrangement of a demultiplexer of FIG. 5.

FIG. 8 shows the basic arrangement of the demultiplexer.

As the bytes of the ATM cells are received, they are stored in the cell buffer until all the cell has arrived and it is then transmitted over the ATM-VC4 SDH output interface.

Clearly, the bandwidth for each TU that is used to carry ATM traffic does not carry TU traffic and therefore "All Ones" will be output for that tributary on the TU-VC4 SDH output interface.

The S bit changes state from 0 to 1 every fifth loop of the quad frame (2.5 ms), so 400 complete changes of bandwidth allocation could be implemented in a second.

When a change of status occurs from TU to ATM or back again it is implemented when the S bit changes state from 0 to 1. The majority decision of the previous 5 states of each ATM/TU Indicator, defines the ATM and TU columns for the next 20 Frames.

There is only one ATM multiplex carried which is made up of all the free TU columns and the 7 ATM only columns.

Because the first columns are not used when packing TU's into a C4, the full complement of TU's can be carried.

The ATM cells make use of all the 260 columns of a C4 and therefore the Control Column uses 0.4% of the payload capacity.

The technique allows all the TU's that are being used to remain in exactly the same position in the payload even as other TU positions are changed to ATM or ATM is changed to TU. This greatly simplifies the control and maintains a constant delay for the TU's.

So although there is a 0.4% loss in efficiency in carrying 100% ATM, this is a very small penalty and an ATM only multiplex could be used in this case. There is often a 50% saving as only one transmission system is required instead of two.

Because the format makes use of standard transmission formats, STM-1, 34368 kbit/s, 2048 kbit/s, etc. they can be carried through intermediate higher order multiplexes and crossconnects in the normal way.

Figure 9:
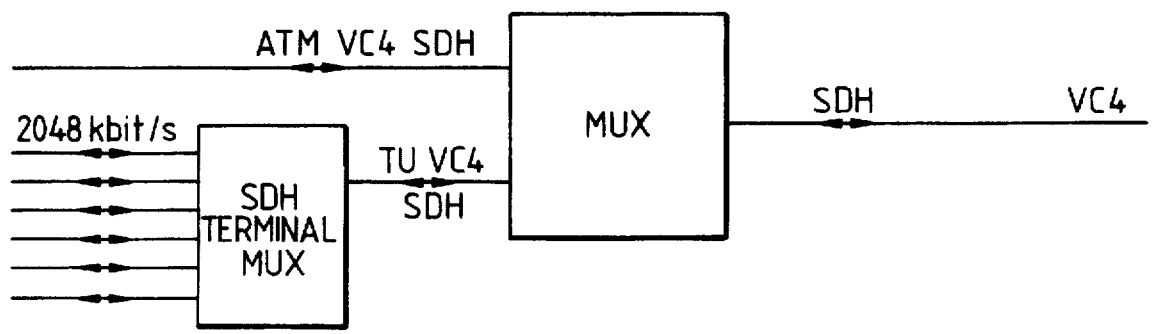
FIG. 9 shows a multiplexer/demultiplexer combined with an SDH Terminal Multiplexer.
Figure 10:
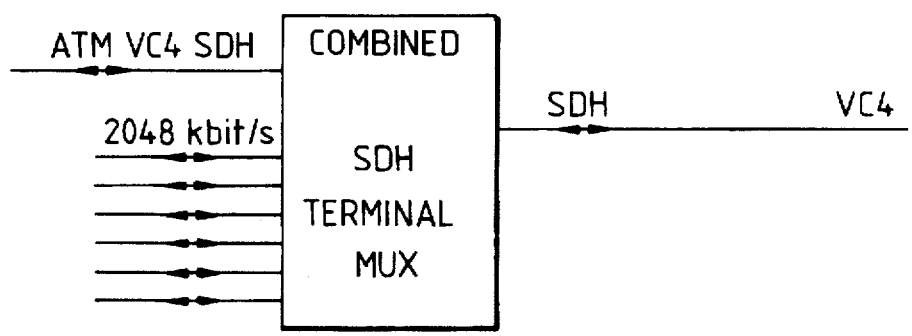
FIG. 10 shows the arrangement of FIG. 9 as a combined unit.

On sites where an ATM delivery of an STM-1 interface is required in addition to the existing primary rate connections a multiplexer/demultiplexer combined with an SDH Terminal Multiplexer could be used. This would eliminate an SDH interface and is shown as separate units in FIG. 9 and as a combined unit in FIG. 10.

The same could be used at the exchange end where the existing services are available on primary rate rather than SDH.

Figure 11:
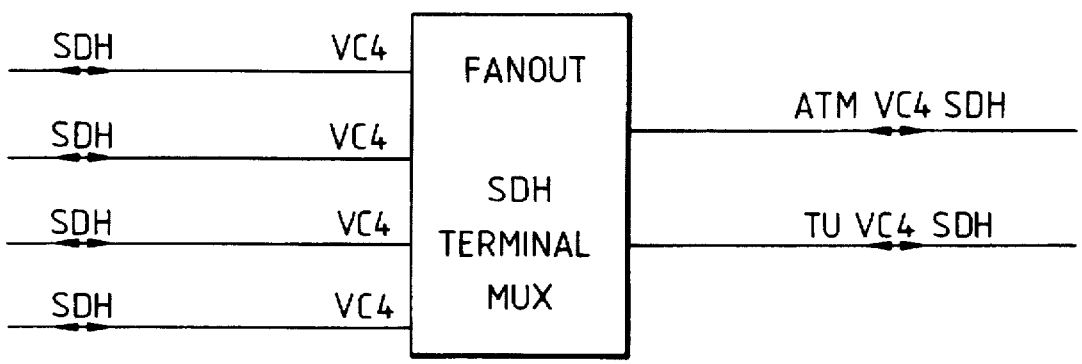
FIG. 11 shows the use of a fanout multiplexer/demultiplexer.

Alternatively at the exchange end a fanout multiplexer/demultiplexer as shown in FIG. 11 could be used.

A Fanout multiplexer/demultiplexer unit, performs circuit concentration and segregation functions on both the ATM and TU traffic collected from say 4 mixed ATM/TU subscribers and delivers that traffic onto an ATM only STM-1 and a TU only STM-1.

As with any SDH interface, there is considerable work to be done in terminating and sourcing the Section Overhead (SOH) and POH functions as well as rejustification, management and maintenance functions. Although there are considerable functional differences, the Fanout unit has many similarities to one of the configurations of the add and drop multiplexer described in Patent Application No. GB 2,242,103A, and therefore it can be considered as a platform on which such a unit could be based.

The use of a multiplexer/demultiplexer for VC4 offers a practical compromise in offering subscribers a single STM-1 interface on which they can be offered ATM services as well as connections to both existing public and private, networks and services. This can be done without the delay penalities of using ATM multiplexing and switching for existing traffic. If necessary, the ATM cells could instead be Frames or other Fast Packets, if they become more accepted than ATM.

Because there is no loss in TU capacity and only 0.4% loss of ATM capacity, this method of combining an ATM multiplex and individual TU's, carrying primary rate traffic, is a practical and very efficient method of offering a subscriber and mix of traffic on his SDH, 155.52 Mbit/s, STM-1 Access Interface.

In the middle of national networks, the need to mix ATM and TU traffic is often limited, but on international and very long haul routes the benefits could be significant.

Having considered the VC4 application, 44736 kbit/s may be a more practical ATM interface to offer a customer and VC4, VC3, 44736 kbit/s and 34368 kbit/s interfaces are now described.

The mixing granularity is at the column level.

A range of possible multiplexing arrangements which are carried within a VC4 or VC3 using the technique will be described.

The arrangement shown in FIG. 12 is a general arrangement of many possible configurations.

The arrangement shows a ring configuration, but by not using one of the ring interfaces it becomes a point to point configuration.

The amount of bandwidth carried on the ring for the broadband subscriber can be a VC3 or a VC4.

The ring could use a 155.52 Mbit/s carrier or a 622.08 Mbit/s carrier.

The combined unit shown only needs to access one VC3 or VC4 which has interesting simplifications on 622.08 Mbit/s rings.

The important dimensioning point, from the transmission view, is that one VC3 or VC4 path has to be provided from the customer site to the exchange supporting that subscriber.

The actual interfaces delivered to the subscriber look very different.

There is one ATM interface. This can be;

STM-1 (155 Mbit/s) carrying a VC4

STM-1 (155 Mbit/s) carrying a VC3 or 44736 kbit/s.

There are a multiplicity of primary rate interfaces for;

PSTN (ISDN) primary rate connections (currently using DASS2)

Private Network interconnections (some using DPNSS)

Other Megastream connections.

A subscriber is offered an access arrangement where he has to pay for a VC3 or VC4 delivery. He then has to pay for the services carried by the multiplexes carried by that delivery. He also understands that if he is using 6×2 Mbit/s primary rate circuits then his ATM multiplex bandwidth is reduced to 34.56 Mbit/s for a VC3 delivery. The actual ATM interface he receives could be 44736 kbit/s or a VC3 or a VC4, the last two being carried by an SDH carrier.

This delivery concept makes it possible for the subscriber to have the connection interface bandwidth different from the delivery bandwidth and different from the service bandwidth.

For example the Subscriber may want a VC4 connection to his ATM equipment, he may only want to pay for a VC3 delivery and he may limit his peak ATM bandwidth service load to 30 Mbit/s.

It should be remembered that, instead of ATM it can of course be any other message based arrangement (e.g. frame relaying or MANY) provided the arrangement is recognised.

At the exchange end, a unit can be used, which is similar to the one at the subscriber end. However as the demultiplexed ATM VC4 and TU VC4 would not be fully utilised, some consolidation of traffic would seem appropriate.

The VC4's and VC3's can be transported by the SDH network to a suitable consolidation point. In FIG. 13 is shown a possible Consolidation Unit.

The Combined (VC3/4) multiplexer/demultiplexer and SDH Add and Drop Multiplexer will normally operate from the timing of the SDH ring.

The method described here makes use of the Z4 byte of the VC4 or VC3 Path Overhead (POH). The description earlier which used the first column of the container for control, would restrict the VC3 capacity, but could be used if preferred. There was also a mention of using Z4 and Z5, but the Z5 byte has now been allocated.

It is being attempted to multiplex a partially loaded 44736 kbit/s VC3 or VC4 multiplex carrying ATM cells and some 2048 kbit/s links into a single multiplexer/demultiplexer VC4 or VC3.

A VC3 Virtual Container is carried as 85 columns. A VC4 Virtual Container is carried as 261 columns. The virtual container is made up of a Container and one column (9 bytes) of Path Overhead.

The multiplexer/demultiplexer must have its own Path Overhead coloumn carried in the normal Path Overhead position and this POH must be generated by the multiplexer/demultiplexer for transmission.

Using Z4 for the control, it is possible to fit one sequence, of the 5 sequences needed for majority voting, in a 48 multiframe cycle. The multifrme is defined in the normal manner by the H4 byte of the POH. This allows 33 updates a second.

This relies on the H4 Multiframe sequence of the POH. The VC3 contains 85 columns (84 columns of TU's) and the VC4 contains 261 (252 columns of TU's).

| Path Overhead | | 1 Column |
| --- | --- | --- |
| | | J1 VC3 Path Trace |
| | | 83 BIP-8 |
| | | C2 Signal Label |
| Path Overhead | | 1 Column |
| | | G1 Path Status |
| | | F2 VC3 Path User Channel |
| | | H4 Multiframe Indicator |
| | | Z3 Operator use |
| | | Z4 CONTROL |
| | | Z5 Tandem path Monitor |
| ATM only | VC3 0 VC4 | 8 columns |
| ATM Cells or TU's | VC3 84 VC4 | 252 columns |

The Z4 format relative to the H4 (multiframe indicator) sequence is shown in FIG. 14.

H4 defines a multiframe loop of 48 Frames.

Within Z4

A0 to A5=Next Byte Number of ATM cell: 00 to 52

001 to 252=252 off ATM/TU Indicators over 48 frame Multiframes. (4 bits not used in frame 45 for VC4) (172 bits not used for VC3)

ATM cell is 0, TU is 1

The S1 bit changes state from 0 to 1 every fifth loop of the multiframe (30 ms), so 33 complete changes of bandwidth allocation could be implemented in a second. S1 remains at 1 for 4 loops. S2 is the complement of S1.

It was suggested earlier with reference to the VC4 embodiment that the All 1's condition would be looked for in each of the defined 2048 kbit/s inputs/TU12 inputs. As the All 1's condition on 2048 kbit/s and TU12 circuits are not quite the same and as the management of SDH should make the reallocation, of the bandwidth of the primary rate circuits, fairly straight forward, it is now suggested that the definition of the ATM/TU bits be restricted to SDH management mechanisms. It is still essential that both a multiplexer and a demultiplexer both implement their ATM/TU definition changes at the same time in order to prevent ATM cell Corruption.

Any columns not defined as being for TU's will be made available for cells.

Master/slave operation and external control can be implemented as before.

Figure 15:
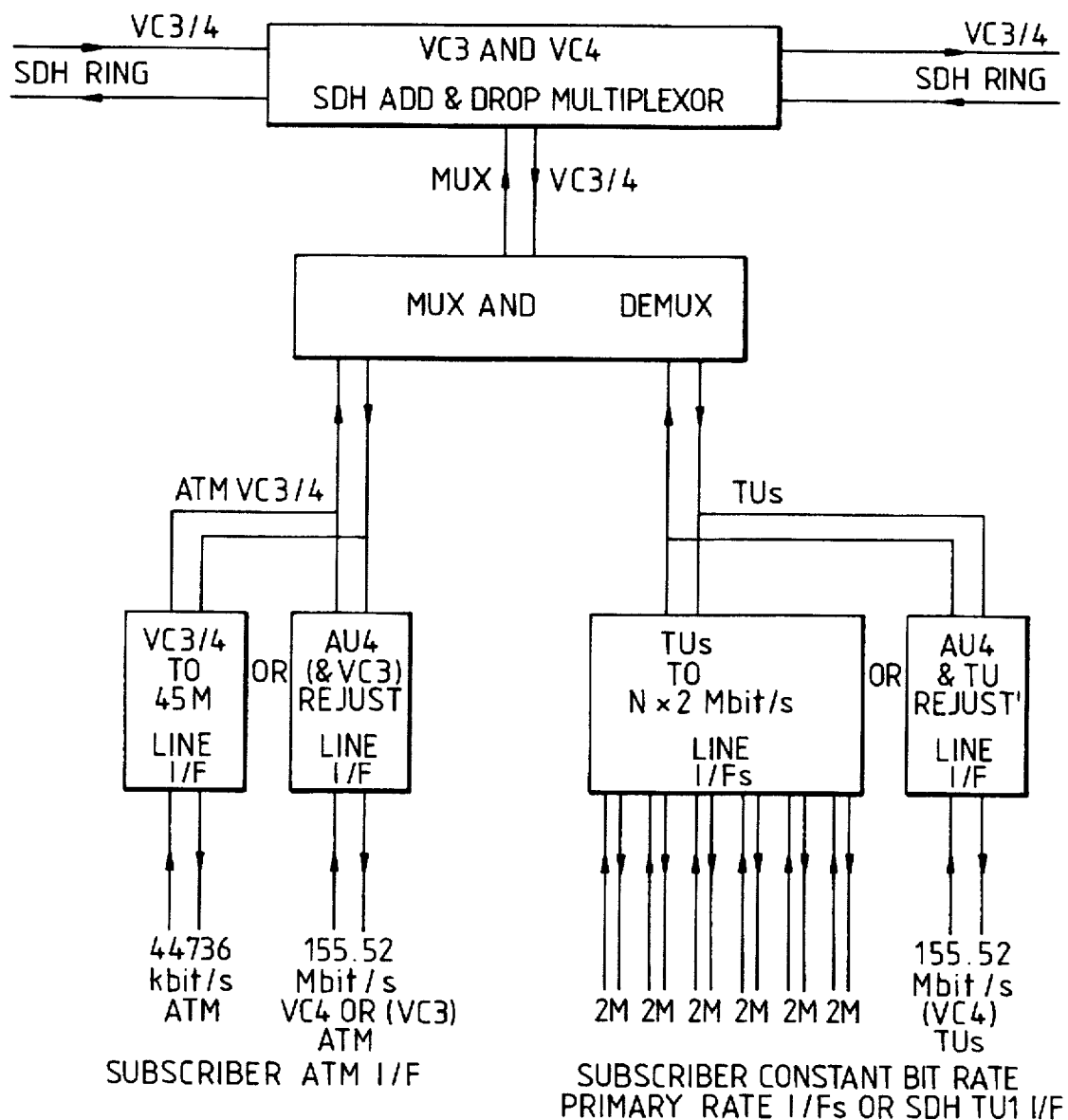
FIG. 15 shows the functional breakdown for a Broadband Add and Drop Multiplexer.
Figure 16:
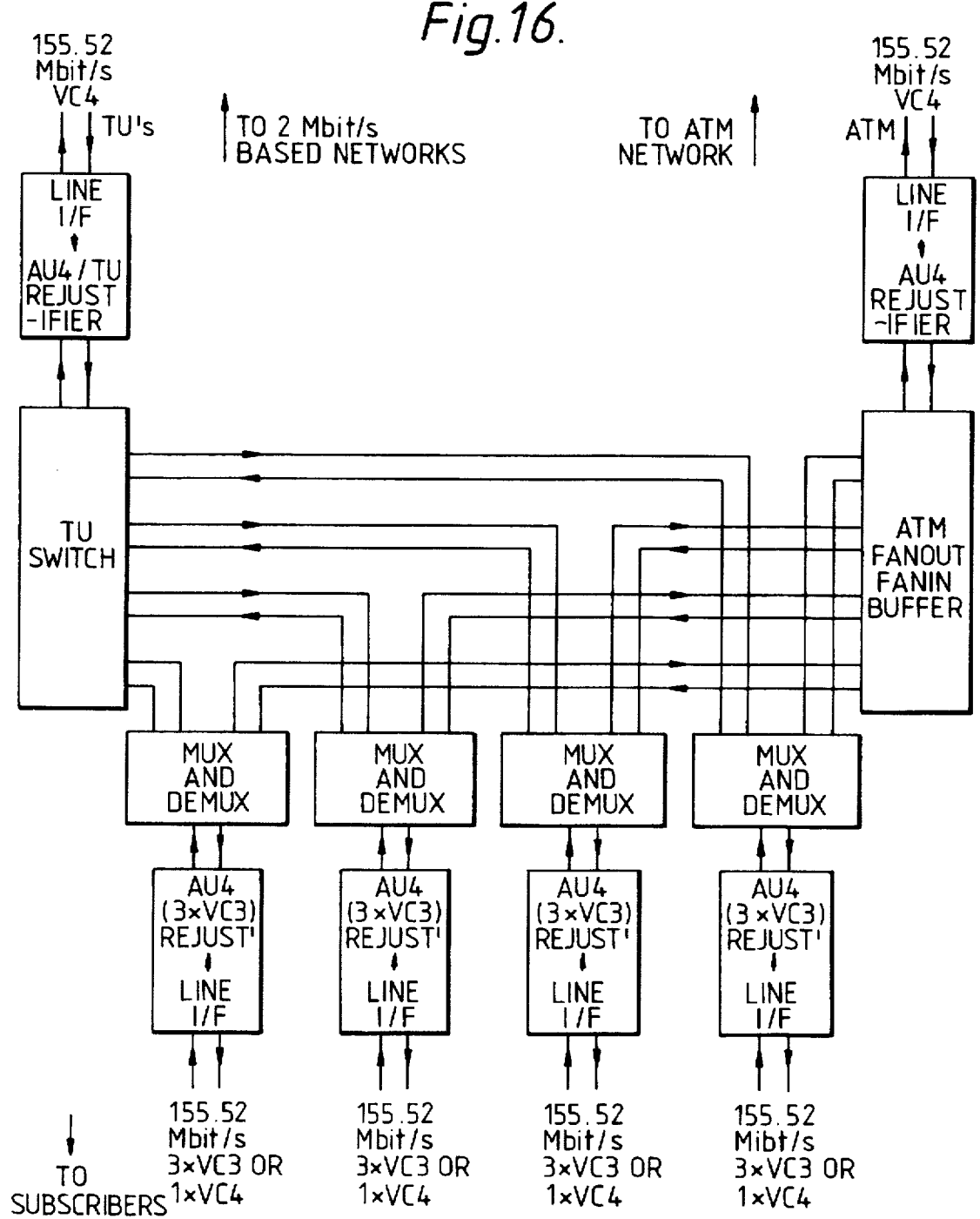
FIG. 16 shows Consolidation Unit.

The functional breakdowns shown in FIG. 15 for a Broadband Add and Drop Multiplexer and in FIG. 16 for a Consolidation Unit are not necessarily the appropriate ways to implement the overall functions, especially if other functions are included to make more general units.

Figure 17:
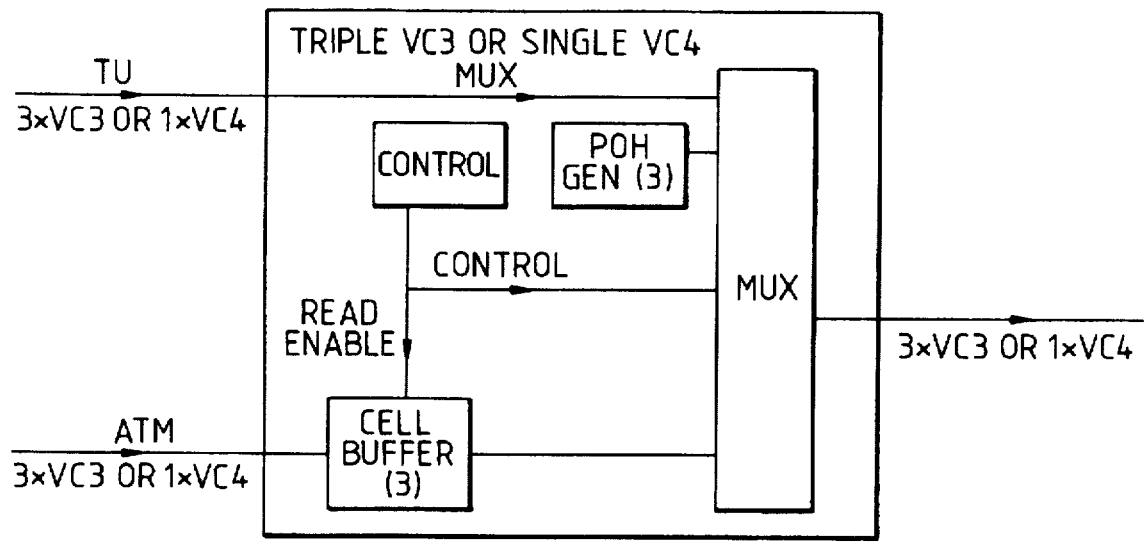
FIG. 17 shows the multiplexer of FIG. 15 or 16 in further detail.
Figure 18:
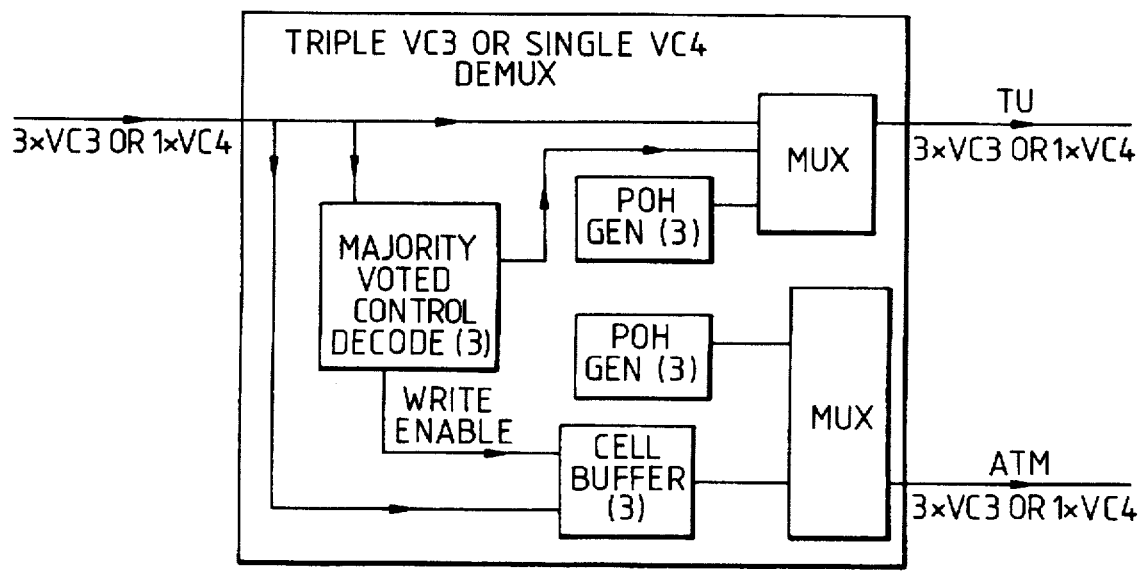
FIG. 18 shows the demultiplexer of FIG. 15 or 16 in further detail.

The functional details of the multiplexer and demultiplexer above are shown in more detail in FIGS. 17 and 18 respectively.

As the bytes of the ATM cells are received by the demultiplexer they are stored in the cell buffer until all the cell has arrived and it is then transmitted over the ATM-VC3/4 SDH interface.

Clearly, the bandwidth for each TU that is used to carry ATM traffic does not carry TU traffic and therefore "All Ones" will be output for that tributary on the (TU 3xVC3 or VC4) SDH output interface. When a change of status occurs from TU to ATM or back again it is implemented when the S bit changes state from 0 to 1. The majority decision of the previous 5 states of each ATM/TU Indicator, defines the ATM and TU columns for the next period of 240 Frames.

There is only one ATM multiplex carried which is made up of all the free TU columns (and the 8 ATM only columns of a VC4).

Because the Supermux control is signalled using the Z4 byte, there is no loss of bandwidth capability.

If one column of the container payload were used for control purposes, there would be one column loss of capacity for ATM and a loss of a whole TU for VC3. However because the first columns are not used when packing TU's into a C4, the full compliment of TU's could be carried by a C4. It is hoped that Z4 will be available for the control function.

The above technique allows all the TU's, that are being used, to remain in exactly the same position in the payload even as other TU positions are changed to ATM or ATM is changed to TU. This greatly simplifies the control and maintains a constant delay for the TU's.

The bandwidth of the ATM service carried can be greatly reduced if appropriate. For example if the subscriber wishes to receive a standard VC4 ATM interface, but only wish to pay for a VC3 delivery then the arrangement will bit rate adapt down to the available bandwidth in the VC3.

Consequently significant savings in the amount of bandwidth required can be offered.

Because standard transmission formats are used, they can all be carried through intermediate higher order multiplexes and crossconnects in the normal way.

Combining a pair of 44736 kbit/s, one carrying ATM and the other carrying 2048 kbit/s tributaries into a 44736 kbit/s formatted multiplex has not been described, as it would not be suitable for Europe. A product that could be used in the USA would be one combining a pair of 44736 kbit/s, one carrying ATM and the other carrying 1544 kbit/s tributaries into a 44736 kbit/s formatted multiplex, but this has not been described. It would require a similar transmultiplexing arrangement as described for 34368 kbit/s.

It is recommended that Timing Indicators such as are described in GB 2,249,002 should be offered in order to minimise the phase distortion to the carried tributaries.

An alternative approach for use with 34368 kbit/s will now be described, wherein the mixing granularity is not 64 kbit/s but 2 Mbit/s.

This mixes a pair of 34 Mbit/s third order systems (CCITT G.703 section 8), one carrying 16×2048 kbit/s formatted as 4×8448 (CCITT G.751) and one carrying ATM cells.

This arrangement relies on all the 8448 multiplexes carrying 4×2048 kbit/s.

The basic arrangement is as shown in FIG. 19.

In order to perform the multiplexer/demultiplexer function the 16×2 Mbit/s link must be transformed into a byte justification scheme shown in FIG. 20. The transform could be described as a rejustification process, but not the same as that used on SDH, the usual transmission description is a transmultiplexer. The justification scheme is a positive justification method which should introduce a small phase distortion.

FIG. 20 shows the basic arrangement of the multiplexer.

If external information is not supplied saying which 2 Mbit/s are in use and which can be replaced by ATM traffic, then the decision should be made on whether "All Ones" is received on a 2 Mbit/s tributary.

FIG. 21 shows the basic arrangement of the demultiplexer.

The bytes of the ATM cells that are received are stored in the cell buffer until all the cell has arrived and it is then transmitted over to 34 Mbit/s ATM interface.

Clearly, the bandwidth for each 2048 kbit/s link that is used to carry ATM traffic does not carry 2048 kbit/s traffic and therefore "All Ones" will be output for that tributary on the 16×2048 kbits 34 Mbit/s output.

Table No. 1 shows an example of a multiplex format for 34368 kbit/s multiplex.

As for a 34368 kbit/s multiplex a 10 bit frame alignment signal occurs every 1536 bits along with an alarm indication bit (AI) and a bit reserved for National use (N). These are followed by 2 S bits and 2 Multiframe bits. This forms the first line of each of the right hand blocks of Table No. 1.

As is usual with positive justification methods, justification control bits are majority voted to say whether the justification byte has been left empty. The method described uses a 4 bit field which is repeated 3 times during the justification loop for each tributary, i.e. JCXXa, etc.

Normally the 4 bit field will be all ones or all zeros when a 2048 kbit/s is carried (all ones being; do a positive justification).

The pattern 0101 continuously inserted in a tributary justification field means the tributary has been allocated to carry ATM.

The SS bits change state every fifth loop of four frames. (20 frames of 1536 bits at 34368 kbit/s) SS bits are 01 or 10. This is a loop of 894 us, so over a 1000 complete changes of bandwidth allocation could be implemented in a second. As this is faster that the recovery of Frame Alignment for a 2048 kbit/s circuit, it should not appear as a restriction.

When a change of status ocurs from 2 Mbit/s to ATM or back again it is implemented when the SS bits change state, the previous 15 justification fields indicating the new status.

There is only one ATM tributary made up of all the free 2 Mbit/s tributaries.

At the demultiplexer the ATM cells are separated and the 2 Mbit/s tributaries are transmultiplexed back to the G.751 format.

The reason that all this transforming is necessary is that unlike the 2048 kbit/s multiplexes which are already in byte form, the plesiochronous higher order systems are bit interleaved.

Bytes required per 2048 kbit/s tributary per 34368 kbit/s frame;

$$(32/0.000125)\times(1536/34368000)=11.441$$

There are 11.5 bytes available for each 2048 kbit/s tributary per 34368 kbit/s frame.

There is only one justification opportunity for each 2048 kbit/s tributary per 4 frames of 34368 kbit/s Therefore there are 46 bytes available and 45.765 bytes are needed and the Justification Ratio is 0.235

46 bytes equates to +5000 ppm.

TABLE NO. 1

| Multi Frame BYTES No. | Frame Bytes No. | Quantity Bytes | | | | |
|---|---|---|---|---|---|---|
| 1 | 1 | 2 | 1111010000 AI N SS 00 | | | |
| 3 | 3 | 46 | 01–16 | 01–16 | 01–14 | |
| 49 | 49 | 2 | JC01a | JC02a | JC03a | JC04a |
| 51 | 51 | 46 | 15–16 | 01–16 | 01–16 | 01–12 |
| 97 | 97 | 2 | JC01b | JC02b | JC03b | JC04b |
| 99 | 99 | 46 | 13–16 | 01–16 | 01–16 | 01–10 |
| 145 | 145 | 2 | JC01c | JC02c | JC03c | JC04c |
| 147 | 147 | 38 | 11–16 | 01–16 | 01–16 | |
| 185 | 185 | 8 | 01j 02j | 03j 04j | 05–08 | |
| 193 | 1 | 2 | 1111010000 AI N SS 01 | | | |
| 195 | 3 | 46 | 09–16 | 01–16 | 01–16 | 01–06 |
| 241 | 49 | 2 | JC09a | JC10a | JC11a | JC12a |
| 243 | 51 | 46 | 07–16 | 01–16 | 01–16 | 01–04 |
| 289 | 97 | 2 | JC09b | JC10b | JC11b | JC12b |
| 291 | 99 | 46 | 05–16 | 01–16 | 01–16 | 01–02 |
| 337 | 145 | 2 | JC09c | JC10c | JC11c | JC12c |

TABLE NO. 1-continued

| Multi Frame BYTES No. | Frame Bytes No. | Quantity Bytes | | | | |
|---|---|---|---|---|---|---|
| 339 | 147 | 38 | 01–16 | 01–16 | 01–08 | |
| 377 | 185 | 8 | 09j 10j | 11j 12j | 13–16 | |
| 385 | 1 | 2 | 1111010000 AI N SS 10 | | | |
| 387 | 3 | 46 | 01–16 | 01–16 | 01–14 | |
| 433 | 49 | 2 | JC05a | JC06a | JC07a | JC08a |
| 435 | 51 | 46 | 15–16 | 01–16 | 01–16 | 01–12 |
| 481 | 97 | 2 | JC05b | JC06b | JC07b | JC08b |
| 483 | 99 | 46 | 13–16 | 01–16 | 01–16 | 01–10 |
| 529 | 145 | 2 | JC05c | JC06c | JC07c | JC08c |
| 531 | 147 | 38 | 11–16 | 01–16 | 01–16 | |
| 569 | 185 | 8 | 01–04 | 05j 06j | 07j 08j | |
| 577 | 1 | 2 | 1111010000 AI N SS 11 | | | |
| 579 | 3 | 46 | 09–16 | 01–16 | 01–16 | 01–06 |
| 625 | 49 | 2 | JC13a | JC14a | JC15a | JC16a |
| 627 | 51 | 46 | 07–16 | 01–16 | 01–16 | 01–04 |
| 673 | 97 | 2 | JC13b | JC14b | JC15b | JC16b |
| 675 | 99 | 46 | 05–16 | 01–16 | 01–16 | 01–02 |
| 721 | 145 | 2 | JC13c | JC14c | JC15c | JC16c |
| 723 | 147 | 38 | 03–16 | 01–16 | 01–08 | |
| 761 769 | 185 | 8 | 09–12 | 13j 14j | 15j 16j | |

What is claimed is:

1. In a telecommunications system, a method comprising the steps of: providing a multiplex format arranged to provide communications capacity in the form of timeslots, said timeslots being arranged in a multiframe sequence; allocating certain ones of said timeslots to constant bit rate traffic circuits; allocating other ones of said timeslots to the carrying of individual bytes of a single message-based multiplex capable of carrying a plurality of message circuits; providing in said other ones of said timeslots information as to which timeslots are allocated to constant bit rate traffic circuits and which timeslots are allocated to the message-based multiplex; repeating the information over a multiframe period; distributing said information in the form of multiple bits over the multiframe period so that over the multiframe period an odd number of distributed multiple bits are included in the format for each timeslot allocated to the message-based multiplex; and identifying timeslot allocation by majority voting between the odd number of distributed multiple bits.

2. The method as claimed in claim 1, wherein the message-based multiplex is Asynchronous Transfer Mode (ATM) traffic.

3. The method as claimed in claim 1, wherein the timeslot allocation information is carried in time slot 16.

4. The method as claimed in claim 1, wherein the timeslot allocation information is carried by use of spare bits.

5. The method as claimed in claim 1, wherein the timeslot allocation information is carried by an SDH communications channel as a path overhead.

6. The method as claimed in claim 1, wherein the timeslot allocation is carried out manually.

7. In a telecommunications system, a multiplexer for providing a multiplex format arranged to provide communications capacity in the form of timeslots, said timeslots being arranged in a multiframe sequence, certain ones of said timeslots being allocated to constant bit rate traffic circuits, and other ones of said timeslots being allocated to the carrying of individual bytes of a single message-based multiplex capable of carrying a plurality of message circuits, said multiplexer comprising: means for carrying in said other ones of said timeslots information as to which timeslots are allocated to constant bit rate traffic circuits and which timeslots are allocated to the message-based multiplex, said information being repeated over a multiframe period, said information being distributed in the form of multiple bits over the multiframe period so that over the multiframe period an odd number of distributed multiple bits are included in the format for each timeslot allocated to the message-based multiplex; and means for identifying timeslot allocation by majority voting between the odd number of distributed multiple bits.

8. The multiplexer as claimed in claim 7; and further comprising means for synchronizing change of timeslot allocation.

9. The multiplexer as claimed in claim 7, in combination with another multiplexer, said multiplexers being connected in a master/slave relationship, wherein one of said multiplexers is arranged to be controlled by the other of said multiplexers.

* * * * *